United States Patent [19]

Severinsky et al.

[11] Patent Number: 5,075,565
[45] Date of Patent: Dec. 24, 1991

[54] TWO-PHASE UNINTERRUPTIBLE POWER SUPPLY

[75] Inventors: Alex J. Severinsky, Silver Spring; Sundar Rajagopalan, Lanham, both of Md.

[73] Assignee: Viteq Corporation, Lanham, Md.

[21] Appl. No.: 670,412

[22] Filed: Mar. 15, 1991

Related U.S. Application Data

[63] Continuation-in-part of Ser. No. 400,656, Aug. 31, 1989, abandoned.

[51] Int. Cl.$^5$ ............................................... H02J 9/06
[52] U.S. Cl. ........................................ 307/66; 363/72
[58] Field of Search ..................... 307/66, 87; 363/72

[56] References Cited

U.S. PATENT DOCUMENTS

| | | | |
|---|---|---|---|
| 2,643,358 | 6/1953 | Murray | 363/72 |
| 3,207,972 | 9/1965 | Love | 363/72 |
| 3,278,825 | 10/1966 | Haas | 363/72 |
| 3,295,044 | 12/1966 | Pledger et al. | 363/72 |
| 3,377,539 | 4/1968 | Bates | 363/72 |
| 4,177,414 | 12/1979 | Roesel et al. | 322/32 |
| 4,527,080 | 7/1985 | Zweig | 307/87 |
| 4,652,770 | 3/1987 | Kumano | 307/66 |

FOREIGN PATENT DOCUMENTS

237983 10/1966 U.S.S.R. .............................. 363/72

*Primary Examiner*—William H. Beha, Jr.
*Attorney, Agent, or Firm*—Banner, Birch, McKie & Beckett

[57] ABSTRACT

Two single phase uninterruptible power supplies are coupled together and controlled such that the two-phase output voltage is matched in frequency and phase with the electrical power provided by the electric utility. The phase difference between the electric utility power lines is measured and stored as a reference signal. When electrical power from the electric utility is lost, the stored reference signal is used to control a master and slave UPS to deliver two-phase power having the same frequency and phase.

6 Claims, 6 Drawing Sheets

TWO-PHASE UNINTERRUPTIBLE POWER SUPPLY

This is a continuation-in-part of application Ser. No. 400,656 filed Aug. 31, 1989 now abandoned.

BACKGROUND OF THE INVENTION

This invention generally relates to a method and apparatus for connecting two single-phase uninterruptible power supplies to provide two-phase electrical power.

The electric power utility typically provides three distinctly different electric services to their customers, depending on their needs. The services differ in the number of power phases. A single phase service is utilized mostly in the power range below 2 kVA while a three phase service is utilized in the power range above 10-15 kVA. In the power range between 2 and 10-15 kVA, two phase service is the most economical and is widely utilized for electronic equipment and in residential and light commercial power distribution.

Single and three-phase uninterruptible power supplies (UPSs) are known in the art and can readily be used to power equipment operated from single phase or three phase power lines. The phase relationship between the power phases in a three-phase UPS is fixed at 120 degrees and 0 degrees in a single phase UPS.

In a two phase distribution system, the phase difference between both phases is not known a priori. It can be either 120 degrees, 180 degrees, or 240 degrees. The phase difference, whatever it is, must be maintained. Because of this uncertainty with respect to phase difference, two phase UPSs which maintain the same phase difference at their output as the electric utility did not exist prior to the present invention.

The prior art solution for two phase power is to use power between phases with a single phase UPS and to generate on the output several different voltages, all in phase with the input. The disadvantage of this approach is costly load rewiring, oversizing due to the increased currents in one of the output conductors, and expensive maintenance bypass installations.

Single phase UPS systems for minicomputers are generally operated from a 208 V input power source. Their output is either 208 and 120 (208/120) or 240/120 volts. The output of these UPSs provides two different voltage values (e.g., 208 and 120 volts), but the voltages are in phase with each other; in other words, the voltage peaks occur at the same instant, making the UPSs single phase.

In single phase 208 volt output UPSs, a new neutral at the secondary winding of the output transformer must be created so that both 208 volt and 120 volt power may be derived. 208 volt is developed from one line to neutral, and 120 volt from the other line to neutral. This configuration results in the neutral conductor carrying extra current, requiring that it and the components in the UPS be oversized. This oversizing is necessary in order for the single phase unit to operate properly and safely, but represents an expense that need not be incurred with use of a two phase UPS.

A second problem associated with protecting minicomputers with a single phase UPS concerns the periodic need for the computer to bypass the UPS and to draw power directly from the utility service. A mechanical device called a maintenance bypass switch, which is external to the UPS, makes it possible for the computer load to bypass the UPS completely and draw current directly from the power line without any interruption of power in the process. This is down so that the UPS can be disconnected for servicing without interrupting computer operations.

Accomplishing this bypass, without risk to the computer and its data, requires that the output from the electrical service be of identical voltage and phase at the instant of bypass to that being drawn from the UPS. In a single phase UPS, achieving this match requires the addition of an isolation transformer to the electrical service outlet that is feeding the maintenance bypass. The transformer must have a secondary winding absolutely identical to the output winding of the UPS.

Installing such a transformer is an expensive process. The transformer must be oversized by at least two times in order to accommodate the way computers draw power. A separate electrical service for the transformer with circuit breakers and a separate ground are also required to meet building safety codes.

Another drawback of using a single phase UPS is that the power distribution to the loads shall be changed from a two-phase type to a single phase type.

For all those reasons, a significant cost advantage can be achieved with a two-phase UPS.

Figure 1:
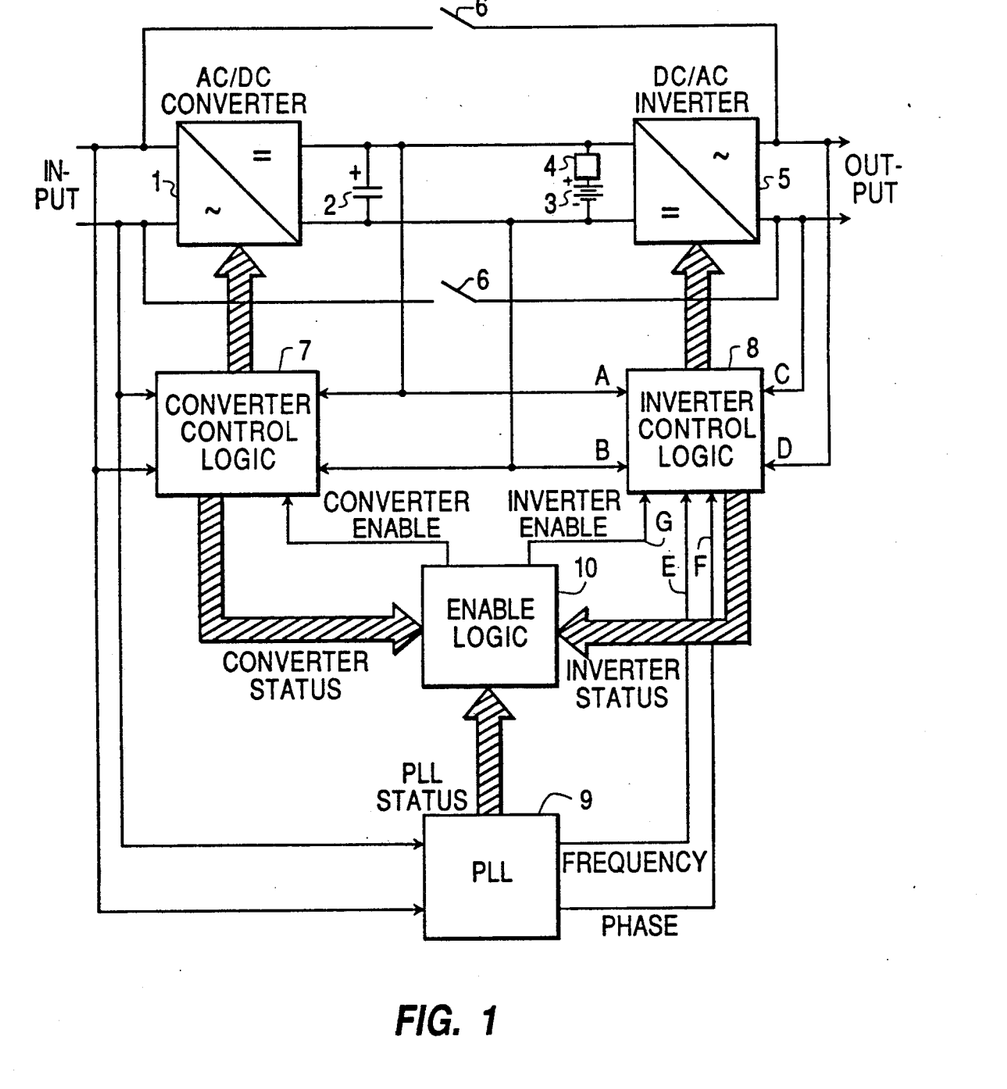
FIG. 1 is a block diagram of a single phase uninterruptible power supply as is known in the prior art.

Single phase UPSs are well known in the prior art and include UPS Model 286/LAN and Model 15A made by VITEQ Corp., the ON-GUARD series of UPSs made by CLARY Corp., the 1200 series of UPSs made by Toshiba, and many similar products. The basic block diagram of this type UPS is shown in FIG. 1. It consists of an input rectifier/AC-DC converter 1, DC storage capacitor 2, battery 3, battery charge/discharge circuit 4, DC-AC inverter 5, and bypass switch 6, all performing power conversion under logic control. Charge/discharge circuit 4 allows the battery to discharge when the converter can not maintain sufficient voltage on capacitor 2 and to charge the battery when this voltage is within the regulation range.

As shown in FIG. 1, there are four distinct logic functional blocks. One block is converter control logic block 7 which takes an input AC signal and an output DC signal and produces a train of pulses to converter semiconductor switches within AC-DC converter 1 in such a way that the DC voltage on capacitor 2 is maintained within a narrow regular range. The second block is inverter control logic 8 which takes three signals on its input to generate a train of pulses to semiconductor switches within DC-AC converter 5 to produce a sine waveform voltage on the DC-AC inverter output. The input signals to inverter control logic 8 are a DC voltage to inputs A and B, an AC feedback voltage from the output of the DC-AC inverter to inputs C and D to maintain the output voltage in the desired narrow range, and frequency and phase reference signals to inputs E and F. An inverter enable signal also is supplied to input G. These signals force the inverter to produce a voltage waveform on its output which has the same frequency and phase as the input voltage to the UPS and is necessary for the proper operation of bypass switch 6 which transfers the load between the input power line and inverter in case of an overload, UPS failure, or during maintenance. All such transfers must be in phase and synchronous.

The frequency and phase reference signals are produced by phase-locked loop circuit 9 (PLL) which can supply to the inverter control logic several signals identifying frequency and phase. PLL 9 takes the voltage on the UPS input, conditions it to a square waveform logic voltage level and then generates the same frequency and phase difference as the input voltage. When input power fails, PLL 9 continues to provide the frequency reference which is close to the input voltage frequency under normal conditions. When input power is restored, PLL 9 resynchronizes the reference signals to the inverter so that the inverter output frequency is again synchronized to the input frequency with no phase shift. The speed of resynchronization is controlled so that frequency sensitive electronic loads will not be out of synch during resynchronization process.

Logic blocks 7, 8, and 9 have digital converter status, inverter status and PLL status signals such as input voltage out of range, not phase locked, or output overload which are supplied to enable logic block 10 which may be a digital decoder hardwired or microprocessor based, which enables converter or inverter operations.

SUMMARY OF THE INVENTION

It is therefore an overall object of the present invention to provide a two-phase uninterruptible power supply, which overcomes the drawbacks of a single phase UPS used to power two phase loads, i.e., oversizing and expensive installations.

It is specific object of the present invention to provide a two-phase uninterruptible power supply which automatically locks two output phases to the same phase difference as between input phases.

These and other objects of the invention are achieved by two single phase uninterruptible power supplies which are coupled together and controlled such that the two-phase output voltage is matched in frequency and phase with the electrical power provided by the electric utility. The phase difference between the electric utility power lines is measured and stored as a reference signal. When electrical power from the electric utility is lost, the stored reference signal is used to control both UPS to deliver two-phase power having the same phase difference as when input power was present.

The above-mentioned and other objects and features of the present invention will become apparent from the following description read in conjunction with the accompanying drawings.

DESCRIPTION OF THE PREFERRED EMBODIMENT

The present invention will now be described with reference to the accompanying drawings.

Figure 2:
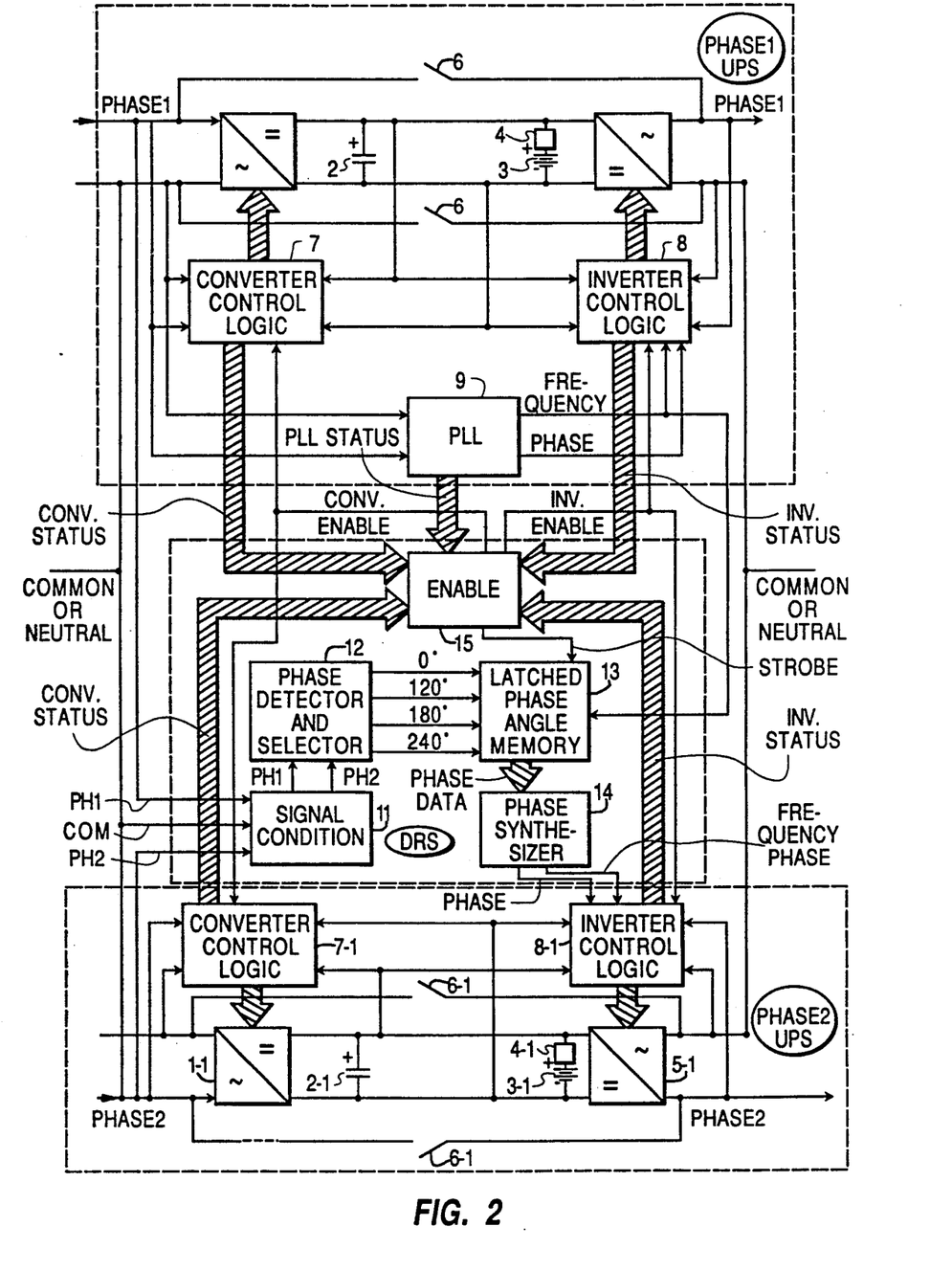
FIG. 2 is a block diagram of a two-phase uninterruptible power supply in accordance with the present invention.

In the invention as shown in FIG. 2, there are two single phase UPSs, each connected to the two input phases of the electrical service. One UPS, Phase 1 UPS for example, is identical to the typical single phase UPS as shown in FIG. 1, with the exception of Enable Logic block 10. The other UPS, Phase 2 UPS, is a modified single phase UPS. The modification involves the replacement of the traditional phase-locked loop (PLL) with a control circuit designed to measure the phase difference between input phases of the electric service and to memorize or store this difference. The control circuit synthesizes the frequency and phase reference signals to the Phase 2 UPS so that they are identical to the corresponding signals supplied to the Phase 1 UPS with the exception of the phase difference. The phase difference is made to be the same as the difference between input phases. Because of the presence of the memory element for storing the phase difference, when the input power disappears the phase difference between both UPSs on the output is maintained to be the same as it was between input phases when power was present. After restoration of power, PLL 9 in the first UPS resynchronizes both UPSs while the phase difference between them is maintained in the second UPS. This is achieved by a phase detection, retention and synthesis (DRS) circuit.

On the input of DRS circuit 20, there is a signal conditioner 11 which is supplied with the two phases of the incoming power. DRS circuit 20 converts both voltages to square wave logic levels which have the same frequency and phase as the sinewave voltages in both incoming power phases. Both of the phase signals are fed to phase detector 12 which detects the value of the phase difference; 0, 120, 180, or 240 degrees. The digital output of the phase detector 12 is supplied to the latched (strobed) input of memory element 13 (any memory elements can be used). This element latches or strobes phase difference data into the memory element 13 by an enable signal from enable logic 0 which is fed by status signals from both UPSs. The status signals include all signals which normally enable the UPSs to operate. After latching, the phase signal is fed into phase synthesis circuit 14 which is synchronized to the frequency of PLL 9 in the first UPS by virtue of the frequency fed to it from the PLL output of the Phase 1 UPS. This circuit generates the frequency and phase signals to this UPS's inverter control logic which are identical to the same signals fed by the PLL to its inverter control logic with the exception that the phase signal is different. The difference in phase between this UPS and the first one is the same as between input phases.

Figure 3:
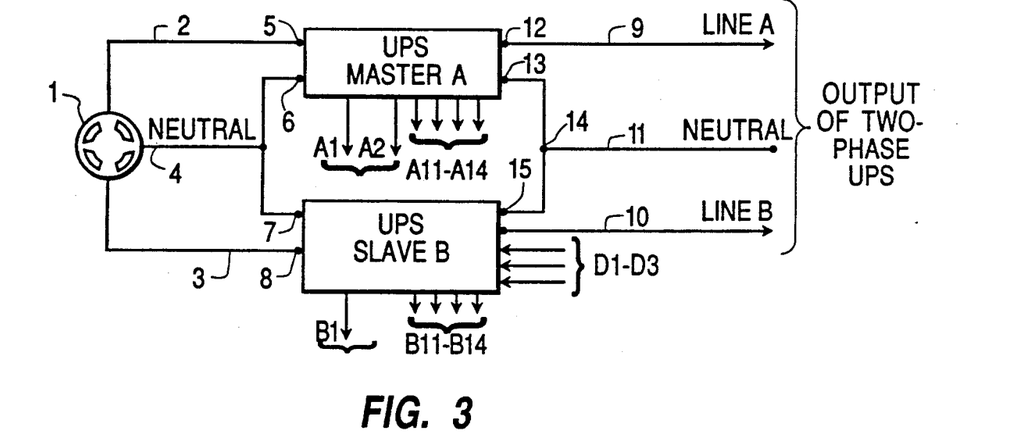
FIGS. 3 and 4 are further block diagrams of a two-phase uninterruptible power supply in accordance with the present invention.

FIGS. 3-7 illustrate in more detail a two-phase uninterruptible power supply in accordance with the present invention. As shown in FIG. 3, the two-phase UPS includes a master UPS A and a slave UPS B which are identical in construction, each being an independent single phase UPS system as is known in the prior art.

The UPSs are connected to AC power plug 1 by phase lines 2 and 3 and neutral line 4. Power plug 1 provides two phase A/C power to the UPSs. Phase line 2 is connected to input 5 of master UPS A and phase line 3 is connected to input 8 of slave UPS B. Neutral line 4 is connected to inputs 6 and 7 of master UPS A and slave UPS B, respectively. Two phase AC power is provided from UPSs A and B on output phase lines 9 and 10 and neutral line 11. The output lines are connected to inputs 12–15 as shown in FIG. 3. Master UPS A has a series of output control signals A1–A2 and A11–A14. Slave UPS B has a series of output control signals B1 and B11–B14 as well as a series of input control signals D1–D2. These control signals are provided to phase selector C, phase synthesizer D and status comparator E shown in FIG. 4.

Figure 4:
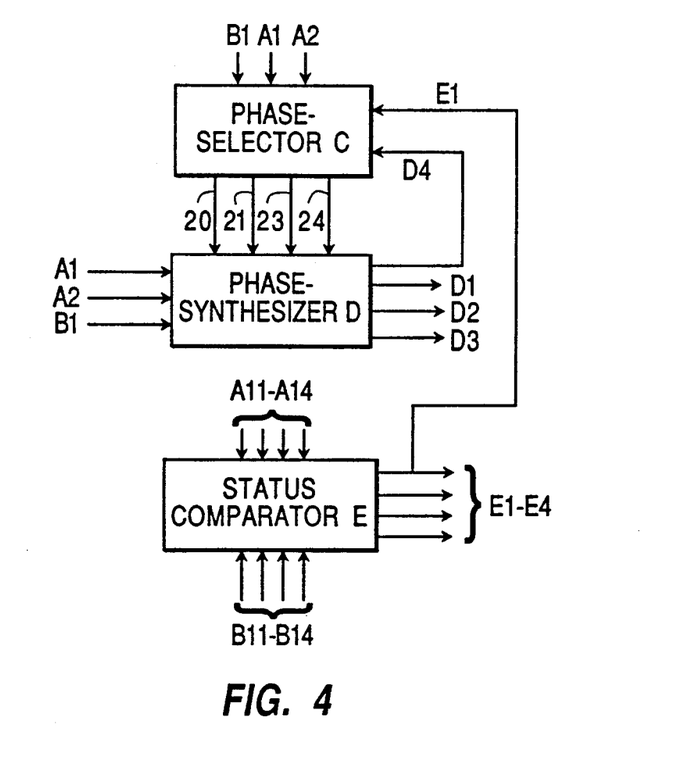

Phase-selector C receives at its inputs square-wave signal A1 which is in phase with the input voltage of master UPS A, square-wave signal A2 having a frequency which is an integer multiple of the frequency of signal A1 and square-wave signal B1 which is in phase with the input voltage of slave UPS B. The frequency of square-wave signal A2 may be for example, 384 times the frequency of signal A1. Phase-selector C also receives logic control signal E1 from status comparator E. Phase-selector C provides logic level output signals 20-23. Only one of these signals can be at a logic "1" state at any given time, depending on the amount of phase-shift between signals B1 and A1.

Phase-Synthesizer D receives output signals 20-23 from phase selector C, signals A1 and A2 from master UPS A and signal B1 from slave UPS B. Phase synthesizer D provides output square-wave signal D4 to phase-selector C as mentioned above along with square-wave signals D1, D2 and D3. Square-wave-signal D1 is at a frequency equal to that of A1 but a phase shifted as dictated by the output of phase selector C. Square-wave signal D2 has a frequency which is an integer multiple of the frequency which is an integer multiple of the frequency of D1, e.g., 384 times the frequency of D1. Logic pulse D2, is at a frequency equal to twice that of D1.

Status-Comparator E receives logic-level signals A11-A14 from UPS Master 1 and logic level signals B11-14 from UPS Slave B. Status-comparator E compares these signals and provides four logic level signals E1-E4 to UPS A and B, replacing signals A11-A14 and B11-B14 in their respective units.

The electrical phase-shift between the line input of UPS Master A and the line input of UPS slave B can be 0 degrees, 120 degrees, 180 degrees or 240 degrees, as provided by AC power plug 1. In operation, Applicant's invention provides two uninterruptible, regulated output voltages, each of which automatically adjusts itself to be in phase with the corresponding voltage from two-phase AC plug 1 or from a single phase source.

UPS master A provides output A1, which is a square-wave of the same frequency and phase as the input voltage (voltage between line 2, 3 and neutral 4). A2 is square-wave output of UPS master A and is, for example, 384 times the frequency of A1. UPS slave B provides square-wave output B1 which is of the same frequency and phase as the AC input voltage to slave B. Utilizing A1, A2, and B1, Phase-Selector C acts to decipher the phase-shift of B1 with respect to A1.

Figure 5:
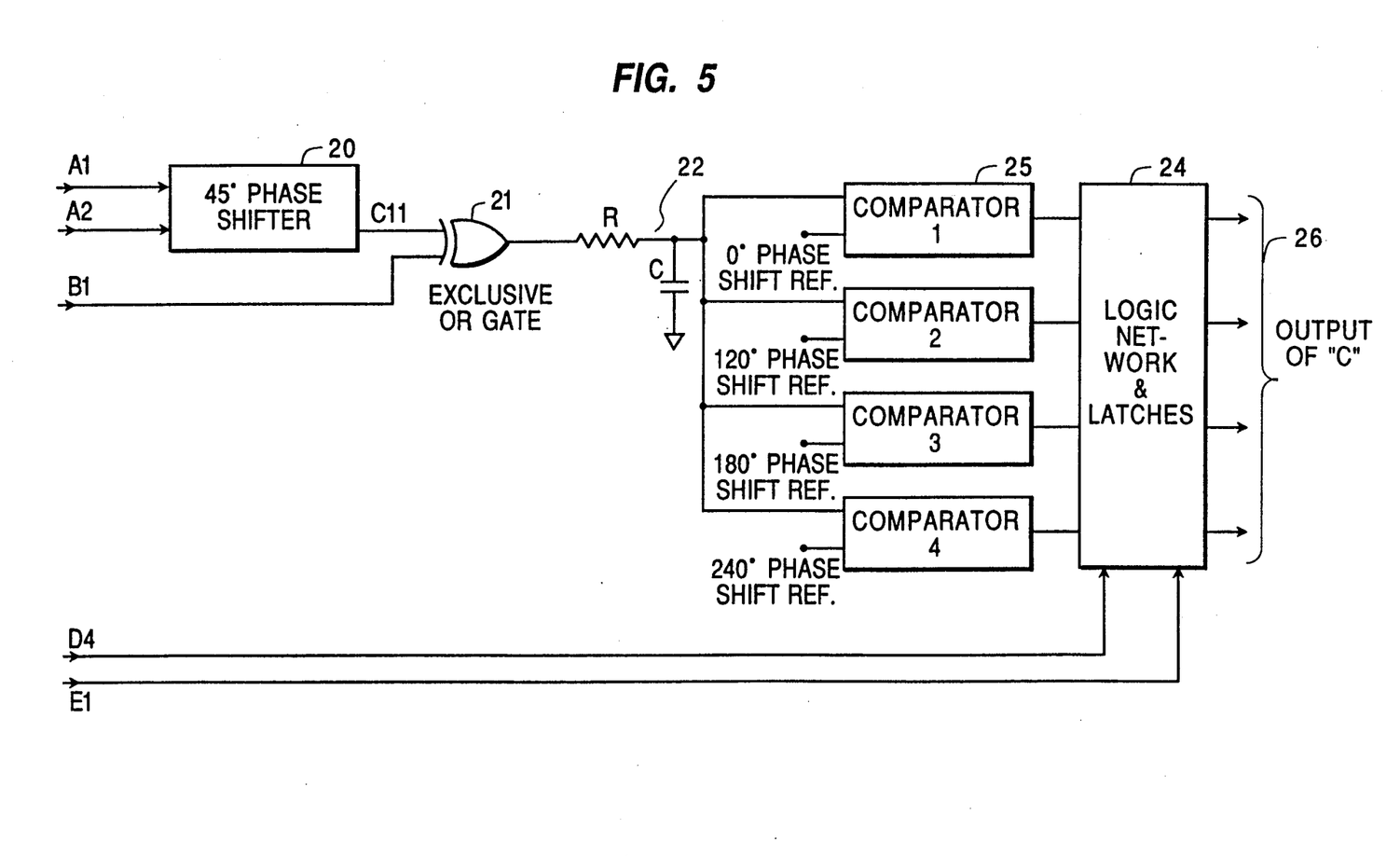
FIG. 5 is a schematic diagram of phase selector C shown in FIG. 3.

As a first step and as also illustrated in FIG. 5, A1 and A2 are combined to produce a square-wave C11 which is phase-shifted from A1 by 45° in phase shifter 20. C11 and B1 are then combined through an exclusive or (EXOR) gate 21 and the output of this gate is filtered through an R-C network 22 with a large time-constant, resulting in an output voltage of the R-C network that is proportional to the phase-shift between A1 and B1. This voltage is then compared to a set of four reference voltages through respective voltage-comparators. A distinct reference voltage level may be set for each of the four possible phase-shifts between the inputs because of the use of the 45° phase-shifter on square-wave A1. If not shifted in phase, the combination of square-waves A1 and B1 at the inputs to the EXOR gate 21 would produce the exact same voltage level at the output of the R-C network 22 when the phase-shift provided by plug 1 (i.e. between A1 and B1) was either 120° degrees or 240 degrees. Thus, there would be no way to distinguish a 120 degree phase-shift from a 240 degree phase-shift.

This problem is solved, however, by shifting A1 45 degrees, and combining this new signal C11 with B1 at the input to the EXOR gate 21. The 120 degree phase-shift of B1 with respect to A1 is distinguished from the 240 degree phase-shift in this manner. This result is achieved because, as is well known in the art, an exclusive OR gate produces a logic level "1" output at any time when the waveforms (square-waves) are unequal in magnitude, and produces a "0" when the magnitudes are equal. By shifting A1 45 degrees, producing C11, B1's phase shifts of 0, 120, 180 or 240 degrees from A1 will produce four different voltage levels at the output of R-C network 22 after C11 is combined with B1 at EXOR gate 21. For example, when C11 is combined with a B1 which is 240 degrees out of phase from A1, the output of the EXOR gate 21 will be a logic level "1" over a broader range of degrees and thus, the charge at capacitor C in RC network 22 will build up for a longer period of time, than if C11 was combined with a B1 which was either 0, 120, or 180 degrees out of phase from A1. As a result of this process, four distinct reference voltages may be utilized to the inputs of the four voltage comparators 23.

The outputs of these comparators are then combined through logic gates 24 to produce four logic signals 26 such that only one of them will remain in the logic "1" state, depending on whether the phase-shift of B1 with respect to A1 is 0 degree, 120 degrees, 180 degrees or 240 degrees. These four logic signals are latched through a set of four latches 25, which can be enabled by the logic "1" state of either E1 or D4. E1 goes to a "1" state when the phase-lock-loops of UPS units A and B are synchronous with their respective input voltage waveforms. Phase locking occurs when an oscillator or periodic generator is controlled so as to operate at a constant phase angle relative to a reference signal source.

At this point in the operation of the present invention, the phase-shift between the two phases of the plug has been measured. What remains to be accomplished is the production of a square-wave which is a duplicate of B1 with respect to A1, in terms of phase-shift and frequency, so that such a signal can be used during electrical interruption at the output. This result is achieved through the use of Phase-Synthesizer D.

Figure 6:
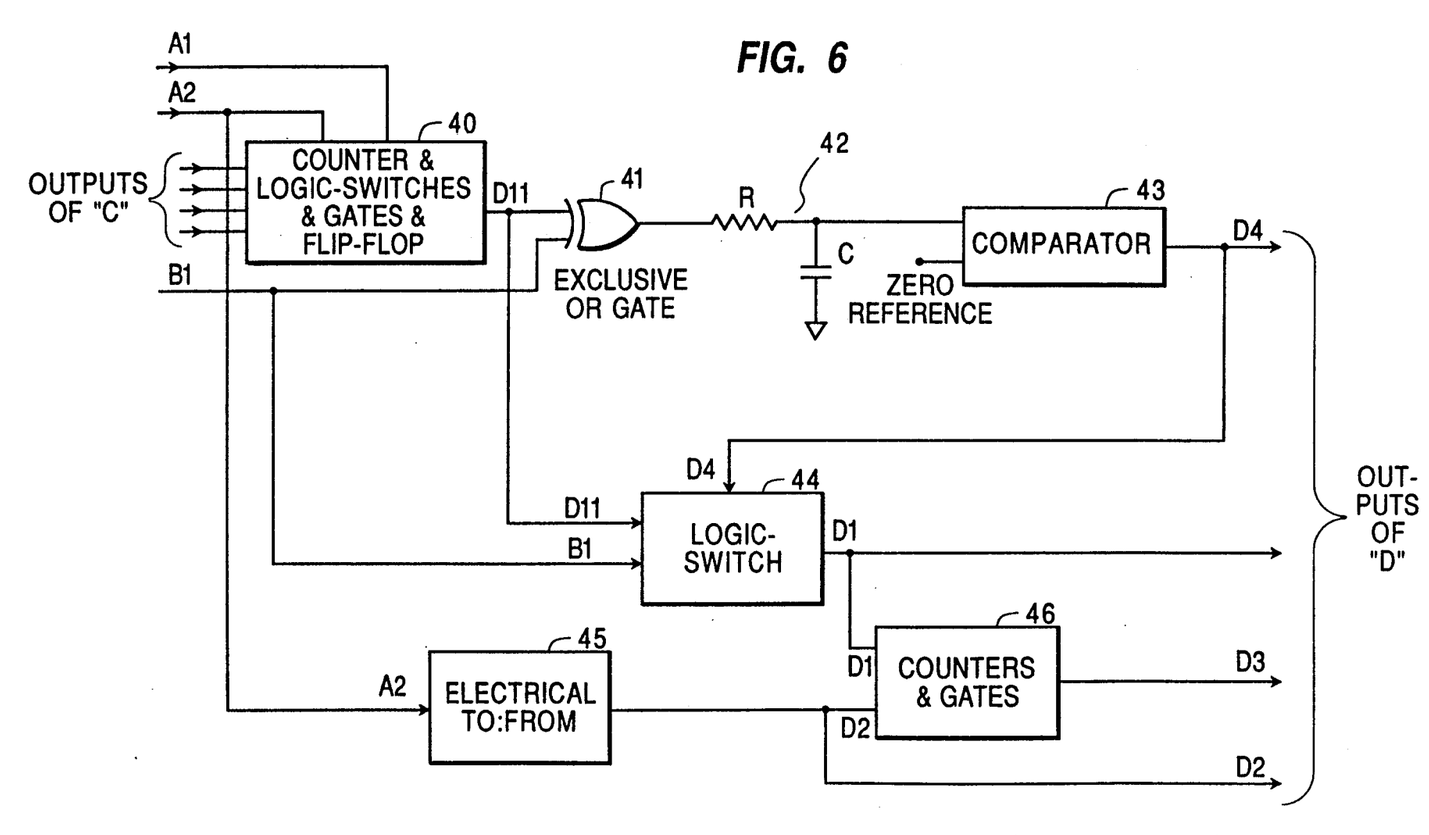
FIG. 6 is a schematic diagram of phase-synthesizer D shown in FIG. 3.

The four latched logic outputs C from latch 25 are fed to a counter 40 in Phase-Synthesizer D as shown in FIG. 6. This counter, along with a set of flip-flops, logic-switches and gates, combines signals A1 and A2 to produce D11 which has the same phase-shift B1 with respect to A1. D11 and B1 are compared through an exclusive OR gate 41 and the output of this gate is averaged through an R-C network 41 with a large time-constant, which provides an output voltage proportional to the electrical phase-shift between B1 and D11. If B1 and D11 are in phase, exclusive OR gate 41 will never rise to a logic "1" level. Thus the voltage at the output of the R-C network will never climb above zero. By comparing this voltage at the output of the R-C network to a low reference voltage through a comparator and having the comparator 43 output signal D4 go to a logic "1" state when they are equal, an indication that B1 and D11 are in phase will result. D4 is used in phase-selector C to latch the four logic outputs of C.

When D4 is in a "1" state, it enables a logic-switch 44 which connects D11 to D1. When it is in a "0" state, indicating the D11 is not in phase with B1, B1 is connected to D1. In this manner, the phase-shift between the two phases of the electrical outlet is preserved as the phase-shift between A1 and D1. The square-wave A2 is processed through electrical isolator 45 to provide D2, which, for example, is 384 times the frequency of D1. D1 and D2 are combined through a set of counters and gates 46 to provide D3 which is a logic pulse whose repetition frequency is twice the frequency of D1. D1, D2 and D3 are fed as inputs to UPS Slave B.

In the event of a power failure at plug 1, UPS Master A continues to operate and provide A1 and A2, besides providing the logic power for units C, D and E. Since the logic inputs to unit D are latched, D1 continues to provide square-wave D1 which has the same phase-shift to A1 as that of B1 to A1. In this manner, it provides a synthesized reference square-wave to UPS Slave B. The outputs of A and B are thus true reproductions of the two voltages, in frequency and phase, of the input electrical power prior to power failure.

Status-Comparator E gets a set of four logic inputs each from A (A11–A14) and B (B11–B14). Each of these four signals are respectively in a "1" state when the respective unit's condition are as described below:

1. the phase-lock-loop of the unit is synchronized to the input voltage waveform from the electrical outlet;
2. the output voltage of the unit is above its under voltage limit;
3. the unit is clear to transfer its load from static bypass to its inverter; and
4. the DC Bus output voltage, current and the Battery Pack voltage are within acceptable limits.

Each pair (from units A and B) is combined through AND gates in unit E after proper electrical isolation. The four corresponding outputs, E1 through E4, are fed to both UPS units A and B, after proper electrical isolation, to replace signals A11–A14 and B11–B14 in their respective units. If any one signal of a pair is in a logic "0" state, it pulls the corresponding signal of the other unit also to a "0" state, thus inhibiting the appropriate functions of both units. In this manner, proper synchronism of operation of UPS units A and B is ensured.

Figure 7:
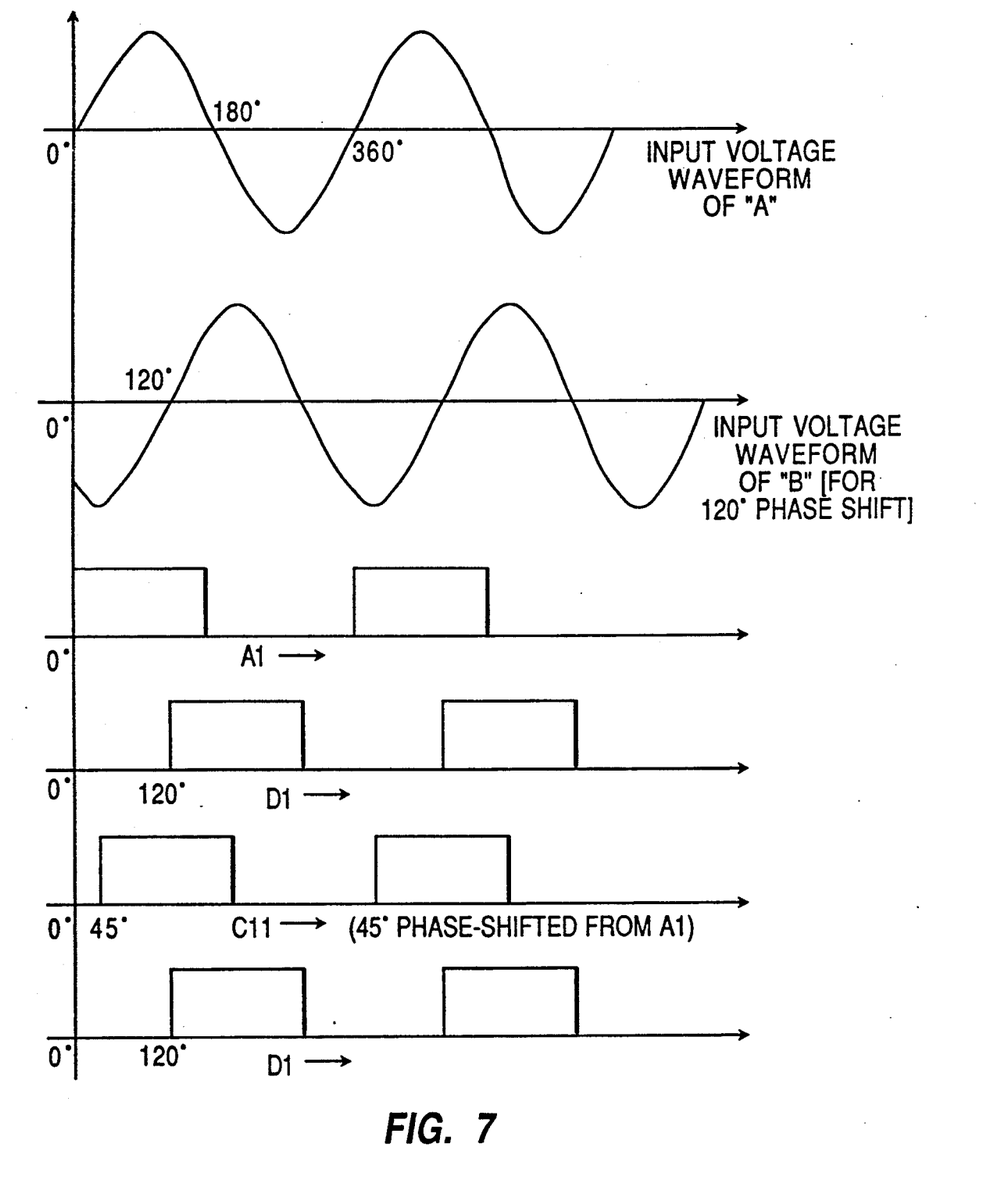
FIG. 7 illustrates various circuit waveforms.

FIG. 7 is a timing diagram illustrating the timing signals present at various points in the control circuitry shown in FIGS. 4 and 5.

While the invention has been illustrated and described in detail in the drawings and foregoing description, it will be recognized that changes and modifications will occur to those skilled in the art. It is therefore intended, by the appended claims, to cover any such changes ad modifications as fall within the true spirit and scope of the invention.

We claim:

1. A two-phase AC power supply, said power supply comprising:

input means for receiving a source of two phase AC power;

output means for providing two-phase AC power from said power supply;

rectifier/converter means connected to said input means for converting said two phase AC power to DC power;

electrical charge storage means connected to said rectifier/converter means for storing electrical energy;

first AC power source means for providing a first source of single phase power, said first AC power source means being coupled to said output means and receiving power from said electrical charge storage means;

second AC power source means for providing a second source of single phase power, said second AC power source means being coupled to said output means; and receiving power from said electrical charge storage means;

first control means for controlling the operation of said rectifier/converter to create a DC voltage on said electrical charge storage means from the AC voltage received from said input means; and second control means for controlling the operation of said first and said second AC power sources to provide a source of two phase power to said output means, wherein the phase angle difference between the phases of the two phase power provided by said first and second AC power sources at said output means is the same as the phase angle difference between the phases of said source of two phase power received by said input means.

2. A two phase AC power supply according to claim 1, wherein said control means includes phase angle measuring means for measuring the phase angle difference between the phases of said source of two phase power received by said input means, said measured phase angle difference being used to establish the phase angle difference between the phases of the two phase power provided by said first and second AC power sources at said output means.

3. A two phase AC power supply according to claim 2, wherein said control means includes phase angle memory means for storing the phase angle difference measured by said phase angle measuring means.

4. A two phase AC power supply according to claim 2, said control means includes frequency measuring means for measuring the frequency of the source of two phase power received by said input means, said measured frequency being used to establish the frequency of the two phase power provided by said first and second AC power source at said output.

5. A two phase AC power supply according to claim 4, wherein upon an absence of a source of two phase power at said input means, said control means automatically control said first and second AC power sources to provide two phase power at said output at the same phase difference of said two phase power received by said input means said two phase power was present.

6. A two-phase AC power supply according to claim 1, further including an electrical storage battery connected in parallel with said electrical charge storage means making said first and second AC power source means uninterruptible.

* * * * *